United States Patent [19]

Starzyk

[11] 4,122,933
[45] Oct. 31, 1978

[54] FEEDER TRANSFER CHUTE

[76] Inventor: Eugene J. Starzyk, 6409 Buena Vista, Greenville, Tex. 75401

[21] Appl. No.: 784,565

[22] Filed: Apr. 4, 1977

[51] Int. Cl.² ............................................. B65G 11/20
[52] U.S. Cl. .......................................... 193/32; 42/87; 221/296
[58] Field of Search ......... 193/2 R, 7, 25 AC, 25 FT, 193/32, 40, 44, 47; 42/50, 87, ; 221/156, 198, 259, 289, 296; 206/3

[56] References Cited

U.S. PATENT DOCUMENTS

| | | | |
|---|---|---|---|
| 1,331,155 | 2/1920 | Johnson | 42/50 |
| 2,336,059 | 12/1943 | Birdsall et al. | 193/25 AC X |
| 2,402,097 | 6/1946 | Spraker | 193/32 X |
| 2,484,104 | 10/1949 | Lippert | 193/25 AC X |
| 2,510,191 | 6/1950 | Nobles | 193/25 AC |
| 2,659,173 | 11/1953 | Capito | 42/87 |
| 2,740,180 | 4/1956 | Nobles | 193/25 AC X |
| 2,838,154 | 6/1958 | Van Fossen | 193/25 AC |
| 3,095,074 | 6/1963 | Neidhardt | 193/40 |
| 3,117,663 | 1/1964 | Payne | 193/40 |
| 3,222,810 | 12/1965 | Musgrave | 42/87 |
| 3,789,531 | 2/1974 | Kersten | 42/87 |

Primary Examiner—Evon C. Blunk
Assistant Examiner—James L. Rowland
Attorney, Agent, or Firm—Burd, Braddock & Bartz

[57] ABSTRACT

A feeder transfer chute lying in a vertical plane is adapted to convey elongated ammunition cartridges by gravity, each cartridge having a projectile at a first end and an extractor groove at a second end. The chute includes parallel spaced apart ribs which cooperate with the extractor groove to confine the second end of the cartridge proximate an end wall of the chute while not appreciably restricting the free fall acceleration of said second cartridge end. A descent restricter in the chute acts upon the first end of the cartridge, continuously retarding its downward progress to hold the acceleration of the second cartridge end to less than free fall acceleration.

15 Claims, 9 Drawing Figures

FEEDER TRANSFER CHUTE

BACKGROUND OF THE INVENTION

This invention has relation to chutes for feeding and conveying ammunition cartridges during manufacture, packaging, loading into clips or magazines or the like for use or storage and directly into guns for firing.

Vertical movement by gravity through chutes which maintain the cartridges to have longitudinal axes in horizontal alignment can be achieved relatively easily if the chutes are run full at all times. However, whenever cartridges are put into an empty or partially empty chute, or otherwise allowed to fall free, they tend to move out of horizontal alignment and to jam in the chute. Often this necessitates at least pushing the cartridges from above to force horizontal realignment until the chute is full and each cartridge rests on the one below to insure substantially horizontal alignment.

The ever increasing period of cartridge manufacturing processes, along with the use of automatic weapons, has increased the need for rapid and reliable means for feeding and transferring large numbers of ammunition cartridges. Cartridges must be handled carefully in view of possible accidential discharge or damage causing failure or erratic discharge from a weapon.

Early feeding mechanisms fed cartridges upward to the firing position using a leaf spring. Such an arrangement is shown in U.S. Pat. No. 1,306,972 to C. A. Nelson, granted June 17, 1919. Refinements include the addition of padding to protect the cartridge projectile and casing. See for example U.S. Pat. Nos. 1,370,617 to J. T. Thompson, granted on Mar. 8, 1921, and U.S. Pat. No. 2,745,203 granted to C. B. Ruple on May 15, 1956.

A device for loading magazines operable in any direction is shown in U.S. Pat. No. 2,659,173 to G. D. Capito, granted on Nov. 17, 1953. A casing 18 snuggly encloses shell S except for the forward end of detonator cap 19 and percussion cap 20. The cartridges are fed by sliding a pusher plate 26.

The prior art includes chutes or clips which feed cartridges downwardly yet rely on means other than gravity. In U.S. Pat. No. 2,834,137 to W. R. Kunz, granted May 13, 1958, a magazine charger has a transverse cross section similar to the longitudinal profile of the cartridges. The cartridges are fed by pressure from the operator's thumb against the top cartridge of the charger, forcing the column downward against a spring. U.S. Pat. No. 3,222,810 to D. D. Musgrave, granted Dec. 14, 1965 discloses a loading clip which retains cartridges in a staggered column. A member 11 is moved downward against the top cartridge to force the bottom cartridge out of the clip against the force of lips 21.

Plastic stackable U-shaped chutes are disclosed in U.S. Pat. No. 2,284,488 to F. C. Johnson granted May 26, 1942. The cartridges fed through each chute are held together by a belt 20. Ribs 16 and 18 support the cartridges and reduce friction as the cartridge belt slides through a particular chute.

One method of positioning cartridges in a chute, particularly those having an extractor groove, is to provide means extending into the extractor groove to limit longitudinal and lateral movement of the cartridge. One example of this is seen in the Musgrave patent at 9 and 37 in FIG. 9.

One method of gravitional feeding utilizes an upright chute containing cartridges in a single vertical column, each cartridge having its longitudinal axis horizontally aligned. This method is operable so long as the chute remains filled, each cartridge supported in horizontal alignment by the one beneath it. When a cartridge experiences free fall, however, as when it enters an empty or partially filled chute, it tends to fall out of horizontal alignment and jam in the chute. Mechanical means for urging jammed cartridges downward in the chute are expensive and in most instances impractical. The alternative is pre-priming, or filling each chute by hand before its connection into a manufacturing system. Pre-priming is inconvenient, time consuming, and costly in view of present manufacturing techniques.

SUMMARY OF THE INVENTION

The invention relates to an apparatus for the gravitational feeding of substantially identical elongated objects. Each object has opposed first front and second rear end portions. As shown, a chute for the transfer and feeding of ammunition cartridges of either straight or tapered body design includes at least a generally upright end wall and opposed vertical side walls which define a passageway, a passageway entrance and a passageway exit. As shown, each cartridge includes a projectile at the first front end portion thereof and a casing having an extractor groove at the second rear end portion. Each cartridge, when positioned at the chute passageway entrance in a substantially horizontal orientation, descends in a vertical plane by gravity and is confined in the passageway to a course of travel toward the chute exit. Guide means act upon each cartridge to limit movement of its second end portion away from the chute end wall without substantially inhibiting the free fall travel of the cartridge through the chute. This serves to limit the amount of deviation of the axis of the cartridge from horizontal.

Restricting means continuously retard the descent of the first end portion so that the acceleration at the cartridge first end portion as it descends in the chute is less than free fall acceleration.

The guide means described herein include two parallel spaced apart extractor ribs adjacent the chute end wall. Each rib extends into the extractor groove to restrict movement of the cartridge in all directions normal to the course of travel. The guide means can also include two parallel spaced apart forward ribs. These ribs, extending toward the cartridge forwardly of the extractor groove, limit movement of the cartridge in the lateral direction and, cooperating with the chute end wall, limit the amount the longitudinal axis of the cartridge can deviate from the horizontal. Other guide means can be effectively used.

In one form of the invention shown, the restricting means includes two opposed flexible velocity control members. Each control member continually elastically engages a portion of the projectile, and it is the friction between each velocity control member and the projectile which retards the projectile's descent. Alternatively, the restricting means can comprise two opposed velocity control ribs, each extending inwardly from the chute walls and having mutually parallel scalloped edges which define a continually curved channel directing the cartridge first portion in a laterally oscillatory path as it descends. Other restricting means can be effectively used.

The restricting means in this combination afford numerous advantages in the feeding of ammunition cartridges. In retarding speed of movement of the cartridge rojectile end to less than its free fall speed, the restricting means prevents that end from falling at a faster rate than the extractor groove end. This prevents the jamming of the cartridge against the guide means which can occur when the cartridge is falling free. This permits cartridges to be transported by gravity in vertical planes through chutes made according to the invention whether those chutes are full, partially full or are empty at the time cartridges are introduced therein.

DESCRIPTION OF PREFERRED EMBODIMENTS

In FIGS. 1, 2, 5 and 6, an upright feeder transfer chute 10 includes a first vertical side wall 12, a second side wall 14 parallel and spaced from the first side wall, and parallel spaced apart first and second end walls 16 and 18. The walls define a passageway of uniform horizontal cross section. A break at 20 indicates that chute 10 may very in length. Shown stackably supported in chute 10 are ammunition cartridges 22 of the rimless, straight body type. Top and bottom portions of first side wall 12 are cut away to reveal four such cartridges, a bottom or lead cartridge 22a, a cartridge 22b, a cartridge 22j and a top cartridge 22k. Cartridges 22 are substantially identical in structure and weight distribution, and are adjacent one another throughout chute 10. Each cartridge 22 includes at a first or forward end, a rounded projectile 24 accounting for most of the cartridge weight. Surrounding projectile 24 is an elongate cylindrical casing 26 including a cylindrical main body 32, an extractor groove 34 and a rear cap 36.

Figures 1, 3:
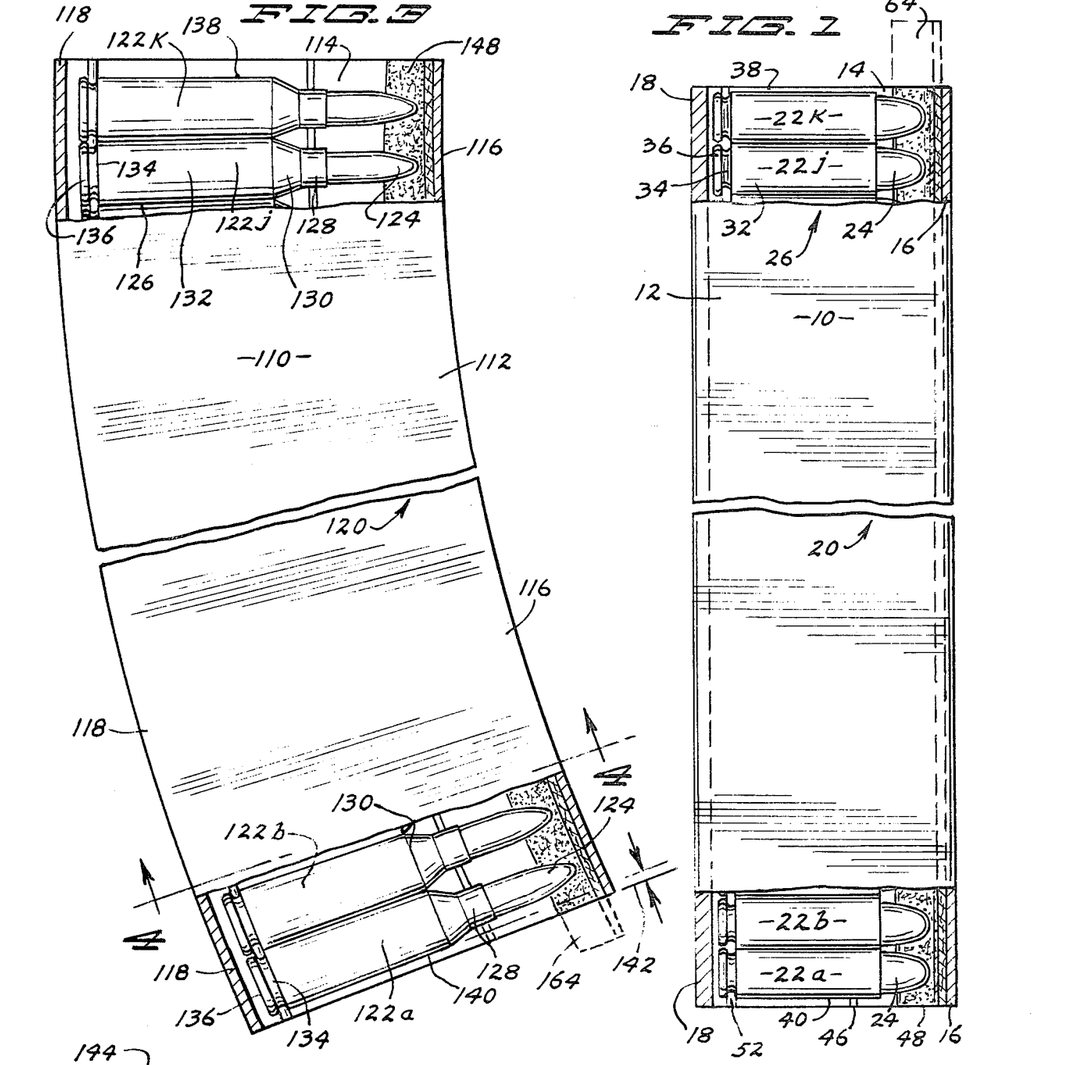
FIG. 1 is a front elevation of a feeder transfer chute in accordance with the invention with parts in section and parts broken away to facilitate illustration.
FIG. 3 is an elevation of a first modification of the transfer feeder chute of FIG. 1 with parts in section and parts broken away to facilitate illustration.

For feeding into chute 10, each cartridge 22 is horizontally oriented at a chute passageway entrance 38. In selected orientation, cartridge 22 is longitudinally aligned in the horizontal direction with projectile 24 pointed toward first end wall 16. Upon positioning and release the cartridge will descend in any empty chute 10 by gravity until reaching its at rest position. The at rest position of lead cartridge 22a is at the chute bottom, supported by means hereinafter described. Each succeeding cartridge 22 falls and arrives at rest above and adjacent the preceding cartridge. The descent of each cartridge is positionally controlled by an extractor groove stabilizing guide 44, a lateral stabilizing guide 46, and a descent restricter 48, all of which span the length of chute 10. Cartridges 22 leave chute 10 by a chute passageway exit 40.

Figure 2:
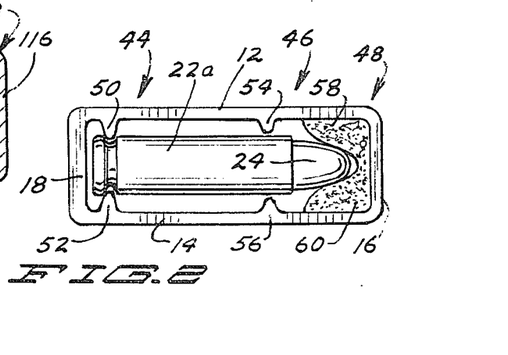
FIG. 2 is a bottom end view of the chute of FIG. 1.

As best seen in FIG. 2, extractor groove stabilizing guide 44 includes a first extractor rib 50 and a second extractor rib 52, each uniform in horizontal cross section throughout chute 10. Extractor ribs 50 and 52 extend inwardly from side walls 12 and 14 respectively and into extractor grooves 34 of cartridges 22 so closely approaching the extractor groove base that even slight lateral movement in the cartridge rear portion brings the extractor groove base into contact with one of the extractor ribs. Longitudinal movement in the cargtridge also is restricted since sufficient movement in either direction brings extractor groove guide 44 into contact with either cap 36 or main body 32. Contact between the cartridge and chute walls, a potential cause of cartridge damage and accidental discharge, is thereby prevented.

Extractor ribs 50 and 52 do not restrict the vertical descent of cartridge 22, so long as the cartridge remains substantially horizontally oriented.

Forwardly of extractor groove guide 44 is lateral stabilizing guide 46 including a first forward rib 54 and a second forward rib 56, each substantially uniform in horizontal cross section throughout chute 10. Forward ribs 54 and 56 project inwardly from first and second side walls 12 and 14, and so closely approach main body 32 as to strictly limit lateral movement in the cartridge forward portion, preventing contact with the chute walls. Forward ribs 54 and 56 do not restrict vertical descent of cartridges 22.

Descent restrictor 48 is flexible and can be a hard or heavy felt for example. Descent restrictor 48 includes a first velocity control member 58 and a second velocity control member 60, each of generally uniform horizontal cross section throughout chute 10. Control members 58 and 60 bulge inwardly toward projectile 24, each pressing against the same to form a contact area in which the velocity control member and projectile 24 are in face-to-face contact. The inwardly facing surfaces of members 58 and 60 are preferably uniform to provide constant friction for a uniform contact area and pressure.

Descent restricter 48 prevents jumping of cartridge 22 against extractor groove guide 44 by counteracting a natural tendency in cartridge 22 to revolve end over end as it descends. In the absence of descent restricter 48 and with cartridge 22 generally horizontal, it descent would be impeded only by friction at extractor groove guide 44 and at lateral stabilizing guide 46, caused by occasional contact from lateral movement of the cartridge. For a substantial portion of its descent, cartridge 22 might contact neither guide and accelerate as in free fall. As most of the cartridge weight is in projectile 24, the cartridge center of gravity is much closer to lateral guide 46 than to extractor groove guide 44. Consequently the friction at guides 44 and 46, however slight, would cause an imbalance of the rotational moments about the center of gravity, and cartridge 22 would revolve clockwise as viewed in FIG. 1. With continued clockwise rotation, cartridge body 32 and cap 36 would simultaneously contact extractor groove guide 44, jamming cartridge 22. Further cartridge descent would require physical contact from below or above, defeating the purpose of a gravity feed chute.

Clockwise rotation sufficient to cause jamming is prevented by descent restricter 48. Descent restricter 48, by its constant contact with downwardly moving projectile 24, provides a continuous upward bias thereaginst so that the net acceleration at projectile 24, throughout the length of chute 10, is less than would be the case in free fall. Consequently, so long as the extractor groove end of cartridge 22 remains vertically unrestricted by extractor groove guide 44, it will tend to fall at a greater velocity than does the projectile end. However, descent restricter 48 must produce a friction sufficiently small so that cartridge 22, entering the top of chute 10, descends solely under the influence of gravity.

To summarize, descent restricter 48 is designed to provide friction within two parameters: A maximum friction less than that which would overcome gravity to prevent cartridge 22 from descending in chute 10; and the minimum friction necessary to continually prevent projectile 24 from experiencing free fall acceleration.

Given that descent restricter 48 is constructed according to the above parameters, the descent of each cartridge 22 occurs according to one or a combination of the following conditions: (1) The moments about the center of gravity remain substantially balanced and cartridge 22 remains substantially horizontally aligned. (2) Initially, the extractor groove end descends more rapidly than the projectile. This rotates cartridge 22 counterclockwise in FIG. 1, causing a tendency in cartridge 22 to jam against extractor groove guide 44. The jamming, however, reduces the descent speed of the extractor groove end at least until it substantially equals the speed of the projectile end. The descent continues slightly out of horizontal alignment but substantially stable. (3) Initially, the extractor groove end descends more rapidly than does the projectile end. The jamming tendency thus caused continues until projectile end is descending more rapidly than than the extractor groove end, rotating the cartridge clockwise. This reduces the jamming tendency, increasing the extractor groove end velocity until it once again exceeds projectile end velocity. Thus cartridge 22 descends in an oscillatory fashion, rotation in either direction being followed by corrective rotation in the opposite direction. Resulting from either condition (2) or condition (3), an equilibrium can develop whereby the deterrent forces of the extractor groove stabilizing guide on the extractor groove end of the cartridge can balance off the friction of the restricter on the projectile end and the cartridge will fall at a substantially stable angle slightly off of horizontal.

The preferred design for descent restricter 48 directs cartridge 22 according to one or a combination of conditions (2) and (3) above. Aside from the practical difficulties in designing a descent restricter according to the first condition, wear to descent restricter 48 caused by its contact with projectile 24 would soon reduce friction below the acceptable minimum. A descent restricter 48 designed according to the second and third conditions can tolerate great wear before it fails to act within the necessary parameters.

For replacement of inspection, descent restricter 48 is slidably removable from chute 10 as indicated by broken lines at 64. The descent restricter or its replacement may than be slidably inserted.

As a practical matter the range of deterrent to downward movement applied to the projectile 24 can vary widely from just short of sufficient to prevent any downward movement of the cartridge to the slightest deterrent possible to be applied which is continuously applied. Thus descent restricters 48 need replacement only at widely spaced intervals to overcome wear.

Figure 4:
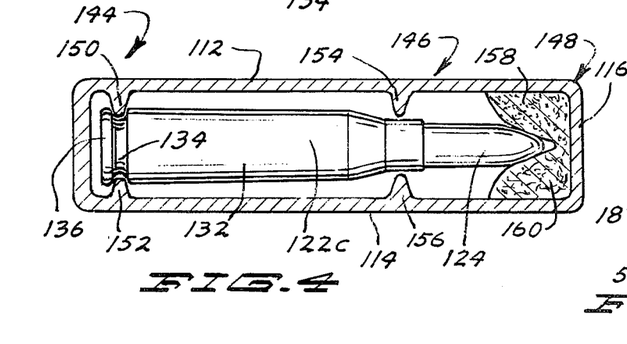
FIG. 4 is a sectional view taken along the line 4—4 in FIG. 3.

FIGS. 3 and 4 show a first modified form of the feeder transfer chute at 110, including parallel spaced apart first and second vertical side walls 112 and 114 and parallel spaced apart first and second end walls 116 and 118. The walls define a passageway of uniform, rectangular cross section parallel to the chute radius of curvature. The curved structure of chute 110 is for the handling of rimless tapered cartridges. A break at 120 indicates that chute 110 may be formed in any convenient length. Stackably supported in chute 110 are rimless ammunition cartridges 122 of tapered body design. Top and bottom portions of first side wall 112 are broken away to reveal four such cartridges, a lead cartridge 122a, a cartridge 122b, a cartridge 122j and a top cartridge 122k in FIG. 3. A cartridge 122c is shown in FIG. 4. Cartridges 122 are substantially identical in structure and weight distribution, and are adjacent one another throughout chute 110 when the chute is filled. Each cartridge 122 includes, at a first or forward end, a tapered projectile 124 accounting for most of the cartridge weight. A casing 126 surrounding projectile 124 includes a neck 128, a conical portion 130 between neck 128 and a tapered main body 132, an annular extractor groove 134, and a rear cap 136 at the rear or second end of the cartridge.

Each cartridge 122 is fed into chute 110 at a chute passageway entrance 138 selectively oriented, i.e. longitudinally aligned with the chute radius of curvature with projectile 124 pointed toward first end wall 116, horizontally aligned as shown. When the chute is emtpy or partially empty, the cartridge then descends by gravity until it reaches its "at rest" position. For lead cartridge 122a, the "at rest" position is at the chute bottom, while such position for each succeeding cartridge is above and adjacent the preceding cartridge. At rest, each cartridge 122 is selectively oriented. The descent of each cartridge 122 in chute 110 is positionally controlled by an extractor groove stabilizing guide 144, a lateral stabilizing guide 146, and a descent restricter 148, all of which span the length of chute 110. Cartridges 122 leave chute 110 by a chute passagway exit 140. A slight angular displacement between bottom cartridge 122a at rest and exit 140 is shown at 142.

In FIG. 4 it is seen that extractor groove stabilizing guide 144 includes a first extractor rib 150 and a second extractor rib 152, each uniform in cross section taken along the chute radius of curvature. Ribs 150 and 152 extend inwardly from side walls 112 and 114 respectively and into extractor groove 134, so closely approaching the base of extractor groove 134 that slight lateral movement in the cartridge rear portion brings the extractor groove base into contact with one of the extractor ribs. Longitudinal movement in the cartridge is also restricted sine such movement in either direction brings extractor groove guide 144 into contact with either cap 136 or main body 132. Thus, potentially damaging contact with the walls is prevented. Ribs 150 and 152 do not restrict cartridge descent, so long as cartridge 122 remains selectively oriented.

Lateral stabilizing guide 146 includes a first forward rib 154 and a second forward rib 156, each substantially uniform throughout chute 110. Ribs 154 and 156 project inwardly from side walls 112 and 114 respectively, and so closely approach neck 128 as to strictly limit lateral movement in the cartridge forward portion and prevent wall contact. Forward ribs 154 and 156 do not restrict vertical descent of cartridge 122.

Descent restricter 148 is flexible and can be a hard or heavy felt or the like. Descent restricter 148 includes a first velocity control member 158 and a second velocity control member 160, each of which is generally uniform in cross section taken along the chute radius of curvature. Each velocity control member bulges inwardly toward projectile 124 and presses against the same to form a contact area in which the velocity control member and projectile 124 are in fact-to-face contact. The contacting surfaces of members 158 and 160 preferably provide substantially constant friction, given uniform contact area and contact pressure.

In the absence of descent restricter 148, cartridge 122 would descend in chute 110 at a velocity closely approaching free fall velocity. Actual velocity would be less than free fall due to the friction at neck 128 from occasional contact with lateral guide 146, and the friction at extractor groove 134 from occasional contact with extractor groove guide 144. As compared with straight chute 10, friction in curved chute 110 at extractor groove 134 is more frequent due to the required curved path. This increases the imbalance in moments about the center of gravity in cartridge 122, thus increasing the tendency for clockwise end-for-end revolving which eventually results in jamming as previously discussed. Nonetheless the acceleration at the extractor groove end of the cartridge by itself is substantially equal to free fall acceleration.

Restricter 148 can be removed and/or replaced by sliding out of the chute 110 as indicated by dotted lines at 164.

Descent restricter 148 counteracts the jamming clockwise revolution by continually providing, at the cartridge projectile end, friction which continuously prevents the net acceleration at projectile 124 from reaching the free fall level. The action is similar to that described in connection with the form of the invention seen in FIG. 1 and 2.

Figures 5, 6, 7, 8, 9:
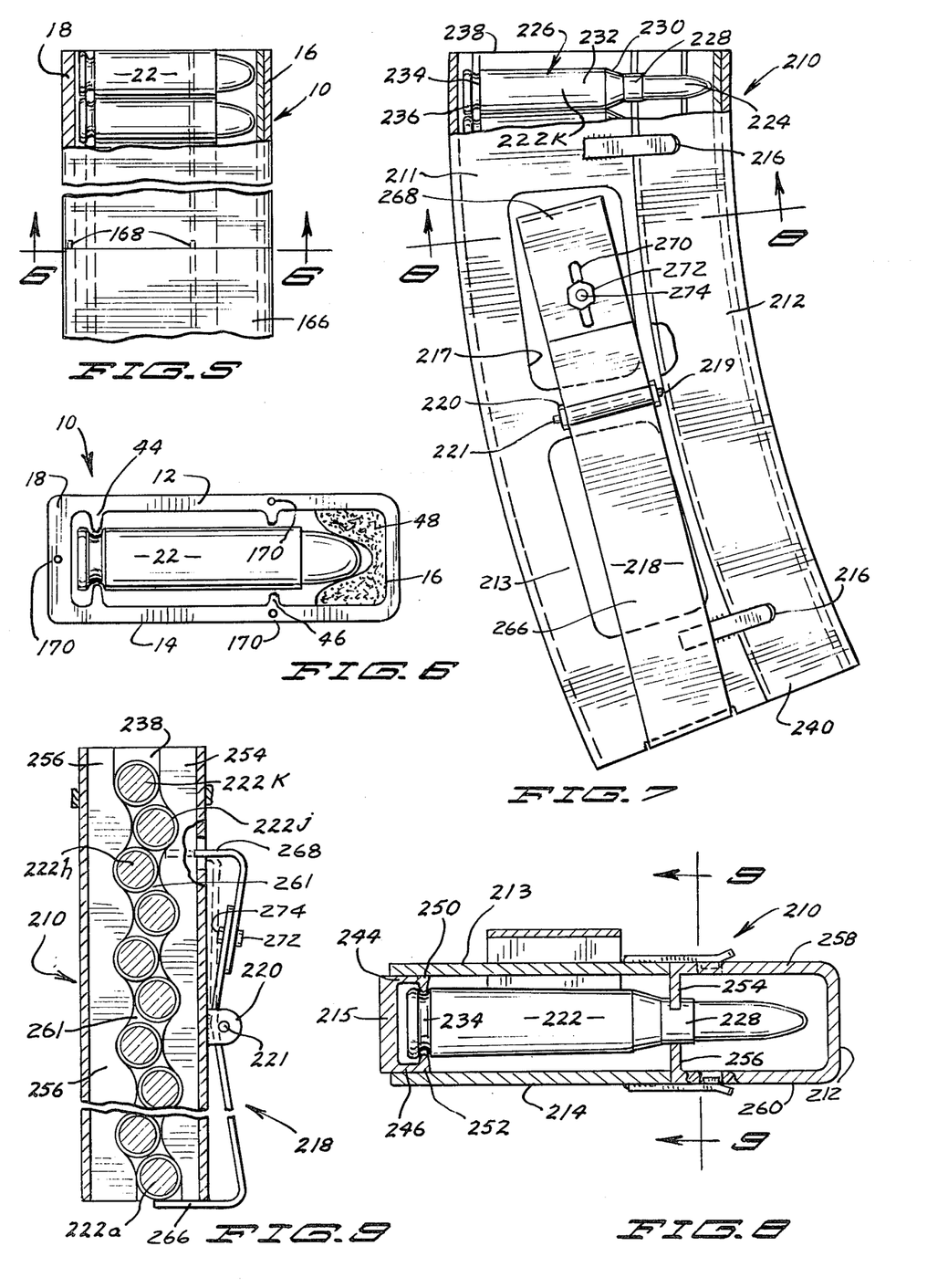
FIG. 5 is an elevational view of the transfer feeder chute of FIG. 1 connected to a lower chute or other means of similar configuration.
FIG. 6 is an enlarged sectional view taken along the line 6—6 of FIG. 5.
FIG. 7 is an elevational view of a second modification of the feeder transfer chute of FIG. 1 with parts in section and parts broken away to facilitate illustration.
FIG. 8 is an enlarged sectional view taken along the line 8—8 in FIG. 7.
FIG. 9 is a sectional view taken along the line 9—9 in FIG. 8

Either of chutes 10 and 110 can be used in conjunction with a transferor chute or other means, a transferee chute or other means, or both. For example, a transferor means may deliver cartridge to a chute 10 or 110 which counts them and delivers a predetermined number to a box or gun clip. A transferee means can be the magazine or clip of an automatic weapon. Connection of straight chute 10 to a transferee means 166 is seen in FIG. 5. Joinder is accomplished by three standards 168 in the transferee means, each of which is insertable into a corresponding adapter opening 170 in the bottom of chute 10. One adapter opening 170 is located in second end wall 18 aligned with the longitudinal center of cartridge 22. The remaining openings 170 are in first and second side walls 12 and 14 proximate the forward ribs. Identical connecting means, not shown, can join the top of chute 10 to a transferor means. This symmetry further allows inversion of chute 10 and joinder of the chute top to transferee means 166. Splines, insertable into openings 170 and openings provided in transferee means 166, can be substituted for standards 168. An added chute can then be used in lieu of transferee means 166.

A second modification of the feeder transfer chute is shown at 210 in FIGS. 7, 8 and 9. Chute 210 is formed by joining a main body 211 and a descent restricter 212. Main body 211 includes a first side plate 213, a second parallel and spaced apart side plate 214, and an extractor groove guide 215 connected to the side plate. Descent restricter 212 is releasably held against main body 211 by a plurality of snap retainers 216. Rectangular openings 217 in side plates 213 and 214 reduce chute weight and provide access interiorly of chute 210 for a cartridge release mechanism 218. Mechanism 218 is pivotally mounted with respect to first side plate 213 by lugs 219 and 220 which rotatably support a pivot pin 221 connected to mechanism 218.

Chute 210 is adapted for rimless tapered body design cartridges 222, each including a projectile 224. A casing 226 includes a neck 228 surrounding projectile 224, a conical portion 230, a tapered main body 232, an extractor groove 234 and a rear cap 236. A top cartridge 222k is shown in FIG. 7 and cartridges 222a, 222h, 222j and 222k are shown in FIG. 9. Cartridges 222 are fed into chute 210 at chute passageway entrance 238 and descend until reaching the chute bottom or the previously uppermost cartridge. Cartridge 222 are extracted from chute 210 through a chute passageway exit 240.

Each cartridge 222 descends entirely due to gravity and is positionally controlled by descent restricter 212 and extractor groove guide 215. Extractor groove guide 215 has a generally uniform cross section along the chute radius of curvature, and includes forwardly extending first and second legs 244 and 246 which abut the first and second side plates, respectively. First and second extractor ribs 250 and 252 extend inwardly from legs 244 and 246 into extractor groove 234 of each cartridge 222, approaching but not necessarily contacting the extractor groove base. Ribs 250 and 252 thereby restrict both longitudinal and lateral movement in the rear portion of cartridge 222.

A first velocity control rib 254 extends inwardly from a first side portion 258 of descent restricter 212. Similarly, a second velocity control rib 256 projects inwardly from a second side portion 260. As seen in FIG. 9, the inward edges of ribs 254 and 256 are scalloped and mutually parallel to form a continually curved channel 261 having a width slightly larger than the diameter of neck 228 of casing 226 of cartridge 222.

Without descent restricter 212, cartridge 222 would descend in free fall acceleration over a substantial portion of chute 210. However, friction from occasional contact with extractor groove guide 215 would tend to cause clockwise end-for-end revolving in the cartridge as viewed in FIG. 7, and jamming of cartridge 222 in guide 215.

Descent restricter 212 forces neck 228 into a laterally oscillatory path, preventing direct descent and therefore continuously preventing the acceleration at neck 228 from reaching the free fall acceleration. If functions in a manner similar to descent restricter 148. The principal difference is that descent restricter 212 does not rely upon friction alone, but also upon the diversion of projectile 224 from a direct vertical descent to provide friction and also a longer path than that for the second end of cartridge.

Similar parameters are applicable. First of all, the deterrent to movement produced by descent restricter 212 on the forward end of cartridge 222 must be less than the minimum required to prevent the cartridge from falling in chute 210 solely due to gravity. Secondly, the deterrent produced must be at least that minimum necessary to maintain acceleration at the projectile end of cartridge 222 of less than free fall of the second end throughout chute 210.

Descent restricter 212 is removed from main body 211 simply by a slight outward prying of snap retainers 216, enabling its separation from the body. It may then be cleaned or inspected. A replacement for descent restricter 212 is installed by pushing the same against body 211. Snap retainers 216 are biased toward closure and snap into place.

Cartridge release mechanism 218 is adapted for releasing a selected group of cartridges from feeder transfer chute 210, while the remaining cartridges are prevented from leaving. Release mechanism 218 is pivotable between a retaining position as shown in solid lines in FIG. 9, and a cut-off position as shown by the broken lines. In the retaining position, a lower arm 266 extends across substantially all of channel 261, preventing any of cartridges 222 from leaving chute 210 through exit 240.

Upon pivoting release mechanism 218 to the cut-off position, a series of cartridges 222 is free to descend out of chute 210, from 222a up to and including cartridge 222h. An upper arm 268 extends into channel 261 a sufficient amount to block the passage of cartridge 222j, thus restricting the number of cartridges 222 leaving chute 210. Following the exit of cartridge 222h, release mechanism 218 is returned to its retaining position, whereupon cartridge 222j descends to the bottom of chute 210, followed by the remaining cartridges 222 in the chute. Another group of cartridges 222 may then be released when mechanism 218 is moved to the cut-off position.

The number of cartridges 222 in the selected group may be increased or decreased by a means for adjusting cartridge release mechanism 218. The adjusting means includes an elongate slot 270 in upper arm 268 and an assembly including a nut 272 and a bolt 274. Slot 270 is seen in FIG. 7 and permits, sliding between arms 266 and 268 guided by movement of the slot with respect to bolt 274 to accommodate the required number of cartridges. Nut 272 can be tightened upon bolt 274 to fix arms 266 and 268 with respect to one another.

If a particular time interval is desired between successive releases of each cartridge 222 or each group of cartridges, mechanical or electrical means, not shown, can be attached to lower arm 266 to pivot it in the preselected interval. This may be accomplished with upper arm 268 removed, if desired.

In the described feeder transfer chute and modifications, the primary function of the descent restricter is to retard the descent of the cartridge projectile end to less than the rate of descent of the rear end, removing the tendency for jamming. Passage through the chute is then accomplished completely due to gravity, permitting a basic chute design which, when compared to more complex prior art structures, is significantly less costly and more reliable. The removable and replaceable descent restricters facilitate maintenance of the chute, further reducing cost. In addition, support by the descent restricter of the forward cartridge end portions maintains the cartridges in stable, selective orientation when in the chute, thus enhancing the safe storage and transport of cartridges contained in the chute.

The embodiments of the invention in which an exclusive property or privilege is claimed are defined as follows:

1. An apparatus for gravitational feeding of elongated substantially identical objects, each object having opposed first and second end portions, and each object being an ammunition cartridge having a forwardly directed projectile at the first end portion and a casing rearwardly of the projectile, said casing including, at the second end portion, means defining an annular extractor groove, said apparatus including:
   a chute having walls including generally vertical side walls defining a passageway, a passageway entrance and a passageway exit, each of said objects, when positioned in the entrance in a selected substantially horizontal orientation, descending in a substantially vertical plane by gravity while confined in the passageway to travel toward the exit;
   guide means acting upon the object to limit the amount of deviation of the axis of the object from horizontal while permitting the object substantially free fall movement in said vertical plane, said guide means including two parallel spaced-apart extractor ribs extending from the walls into the extractor groove; and
   restricting means for continually retarding the descent of said first end portion to hold acceleration thereof to less than free fall acceleration.

2. The apparatus of claim 1 wherein: the restricting means includes two opposed velocity control members, each control member continually elastically engaging a portion of the projectile, friction between the descent restrictor and the projectile retarding projectile descent.

3. The apparatus of claim 2 wherein: the restricting means are removably attached to the chute walls.

4. The apparatus of claim 3 wherein: the guide means further include two parallel and opposed forward ribs extending from the walls toward the casing forwardly of the extractor groove.

5. The apparatus of claim 4 wherein: opposing the walls of the chute are straight to define a substantially vertical passageway of uniform horizontal cross section, and the cartridges are of straight body design.

6. The apparatus of claim 5 including: connecting means at the entrance for joinder of the chute to a transferor means, and connecting means at the exit for joinder of the chute to a transferee means.

7. The apparatus of claim 4 wherein: opposing end walls of the chute are curved to define an arcuate passageway, and the cartridges are tapered in body design.

8. The apparatus of claim 4 including: stop means adapted to prevent egress of cartridges from the chute and to stackably support the cartridges in the passageway.

9. An apparatus for storage, transfer and gravitational feeding of substantially identical ammunition cartridges, each having a forwardly directed projectile at a first end portion, a casing rearwardly of the projectile, said casing including, at a second end portion of the cartridge, means defining an annular extractor groove, said apparatus including:
   a generally upright chute having walls defining a passageway, a passageway entrance and a passageway exit, each of said cartridges, when positioned at the entrance in a selected generally horizontal orientation, descending by gravity while confined in the passageway to travel toward the exit;
   the passageway being normally rectangular to the direction of travel of the cartridges therethrough;
   guide means including two parellel spaced-apart extractor ribs extending from the chute walls into the extractor grooves of the cartridges, said guide means acting upon the cartridges to restrict movement normal to the direction of travel while permitting substantially free fall in said direction;

restricting means for continually retarding the descent of said first end portion of said cartridges to hold acceleration of said first end portion to less than free fall acceleration; and wherein the restricting means includes two opposed velocity control ribs extending inwardly from the walls and having mutually parallel scalloped edges defining in the chute a continually curved channel directing the first end portion in a laterally oscillatory path as it travels toward the exit.

10. The apparatus of claim 9 wherein: the restricting means comprise a descent restrictor removably attached to the remainder of the chute by a plurality of snap connectors.

11. The apparatus of claim 9 wherein: the chute is stright and defines a substantially vertical passageway of uniform horizontal cross section, and wherein the cartridges are straight in body design.

12. The apparatus of claim 11 including: connecting means at the entrance for joinder of the chute to a transferor means, and connecting means at the exit for joinder of the chute to a transferee means.

13. The apparatus of claim 9 wherein: opposed end walls are curved to define an arcuate passageway and the cartridges are of tapered body design.

14. An apparatus for storage, transfer and gravitational feeding of substantially identical ammunition cartridges, each having a forwardly directed projectile at a first end portion, a casing rearwardly of the projectile, said casing including, at a second end portion of the cartridge, means defining an annular extractor groove, said apparatus including:

a generally upright chute having walls defining a passageway, a passageway entrance and a passageway exit, each of said cartridges, when positioned at the entrance in a selected generally horizontal orientation, descending by gravity while confined in the passageway to travel toward the exit;

the passageway being normally rectangular to the direction of travel of the cartridges therethrough;

guide means including two parallel spaced-apart extractor ribs extending from the chute walls into the extractor grooves of the cartridges, said guide means acting upon the cartridges to restrict movement normal to the direction of travel while permitting substantially free fall in said direction;

restricting means for continually retarding the descent of said first end portion of said cartridges to hold acceleration of said first end portion to less than free fall acceleration;

a mechanism for controlling the quantity of cartridges released from the chute, said mechanism being pivotally mounted with respect to the chute for movement between first and second pivot positions, said mechanism including a lower arm adapted to prevent passage of cartridge from the exit with said mechanism in a first pivot position, and an upper arm adapted to prevent passage of cartridges beyond a preselected location in the passageway with the mechanism in the second position; and wherein the upper arm is adjustably connected to the lower arm whereby preselected location in the passageway is variable.

15. The apparatus of claim 4 wherein: the mechanism is mounted outwardly of the passageway, said chute including means defining an opening in the walls to permit entrance of the upper arm into the passageway.

* * * * *

UNITED STATES PATENT AND TRADEMARK OFFICE
CERTIFICATE OF CORRECTION

PATENT NO. : 4,122,933
DATED : October 31, 1978
INVENTOR(S) : Eugene J. Starzyk

It is certified that error appears in the above-identified patent and that said Letters Patent are hereby corrected as shown below:

Column 1, line 20, "period" should be --speed--.

Column 3, line 37, after "second", insert --vertical--.

Column 4, line 44, "jumping" should be --jamming--.

Column 4, line 48, "it" should be --its--.

Column 5, line 1, "thereaginst" should be --thereagainst--.

Column 6, line 42, "passagway" should be --passageway--.

Column 6, line 55, "sine" should be --since--.

Column 8, line 6, "whih" should be --which--.

Column 8, line 50, "If" should be --It--.

UNITED STATES PATENT AND TRADEMARK OFFICE
CERTIFICATE OF CORRECTION

PATENT NO. : 4,122,933
DATED : October 31, 1978
INVENTOR(S) : Eugene J. Starzyk

It is certified that error appears in the above-identified patent and that said Letters Patent are hereby corrected as shown below:

Column 10, Claim 5, line 1, "the", second occurrence, should be --end--.

Column 10, Claim 9, line 16, "parellel" should be --parallel--.

Column 11, Claim 11, line 2, "stright" should be --straight--.

Signed and Sealed this

Sixth Day of February 1979

[SEAL]

Attest:

RUTH C. MASON
*Attesting Officer*

DONALD W. BANNER
*Commissioner of Patents and Trademarks*